United States Patent
Belenky et al.

(10) Patent No.: US 7,908,654 B2
(45) Date of Patent: Mar. 15, 2011

(54) ACCOMODATING FRAGMENTATION WITH DETERMINISTIC PACKET MARKING

(75) Inventors: Andrey Belenky, Brooklyn, NY (US); Nirwan Ansari, Montville, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1766 days.

(21) Appl. No.: 11/079,451

(22) Filed: Mar. 14, 2005

(65) Prior Publication Data
US 2005/0204170 A1 Sep. 15, 2005

Related U.S. Application Data

(60) Provisional application No. 60/552,645, filed on Mar. 12, 2004, provisional application No. 60/552,647, filed on Mar. 12, 2004, provisional application No. 60/553,212, filed on Mar. 15, 2004.

(51) Int. Cl.
*H04L 29/14* (2006.01)
(52) U.S. Cl. .......................................................... 726/22
(58) Field of Classification Search .................. 713/153, 713/160, 162, 168
See application file for complete search history.

(56) References Cited

U.S. PATENT DOCUMENTS

| 5,835,726 | A | 11/1998 | Shwed et al. | |
|---|---|---|---|---|
| 6,978,223 | B2 | 12/2005 | Milliken | |
| 6,981,158 | B1 | 12/2005 | Sanchez et al. | |
| 7,200,105 | B1 | 4/2007 | Milliken et al. | |
| 7,415,018 | B2 * | 8/2008 | Jones et al. | 370/392 |
| 7,752,324 | B2 * | 7/2010 | Hamadeh et al. | 709/230 |
| 2004/0093521 | A1 | 5/2004 | Hamadeh et al. | |
| 2005/0086520 | A1 | 4/2005 | Dharmapurikar et al. | |

OTHER PUBLICATIONS

P. Ferguson and D. Senie, Network ingress filtering: Defeating denial of service attacks which employ IP source address spoofing, May 2000, RFC 2827.
S. Savage et al., Network support for IP traceback, IEEE/ACM Trans. Networking, Jun. 2001, pp. 226-237, vol. 9, No. 3.
P. Srisuresh and K. Egevang, Traditional IP network address translator, (traditional NAT), Jan. 2001, RFC 3022.

(Continued)

*Primary Examiner* — Minh Dinh
(74) *Attorney, Agent, or Firm* — Connolly Bove Lodge & Hutz LLP

(57) ABSTRACT

The deterministic packet marking (DPM) method is based on marking packets with the partial address information of ingress interface only. The attack victim is able to recover the complete address(es) information after receiving several packets from a particular attacking host or hosts. The full path is not really essential for the traceback since it can be different for different packets for different reasons. In order to deal with fragmentation, it is required that the ID field (as well as some other fields) of all the fragments in a given series is the same. DPM randomly selects the marks from the pool, which is created at startup. The mark completely occupies the ID field in the IP packet header, as well as Reserved Flag. Since every single packet passing through the DPM-enabled interface is marked, the ID field of all the fragments of a series are ensured to be the same. By allowing DPM to suspend randomness in selecting the marks for the fragments of a series, all fragments are ensured to have the same ID. This ID would be different from the one originally set by the origin of the packet, but this would not make a difference for the reassembly process.

17 Claims, 11 Drawing Sheets

```
Marking procedure at router R, edge interface A:
    for z = 0 to f - 1
        Digest:= Hz(A)
        for y = 0 to k - 1
            Marks[z x k + y].Hash_num := z
            Marks[z x k + y].Digest := Digest
            Marks[z x k + y].Seg_Num := y
            Marks[z x k + y].A_bits := A[y]
    for each incoming packet w
        let x be a random integer from [0, f x k)
        if w.MF == '1' OR w.offset ≠ 0 then
            if FragTbl[SA, DA, P, ID] == NIL then
                create FragTbl[SA, DA, P, ID]
                FragTbl[SA, DA, P, ID] := x
            else
                x := FragTbl[SA, DA, P, ID]
        write Marks[x] into w.Mark
```

OTHER PUBLICATIONS

D. Moore et al., Inferring internet denial of service activity, Proc. of 10th USENIX Security Symposium, 2001, pp. 9-22.

R.K.C. Chang, Defending Against flooding-based Distributed Denial-of-service attacks: a tutorial, IEEE Commun. Mag., Oct. 2002, pp. 42-51, vol. 40, No. 10.

A. Belenky and Nirwan Ansari, On IP traceback, IEEE. Commun. Mag., Jul. 2003, pp. 142-153, vol. 41, No. 7.

S.M. Bellovin, ICMP traceback messages, IETF Draft, Mar. 2000.

N. Dean et al., An algebraic approach to IP feedback, ACM Trans. on Information and System Security (TISSEC), May 2002, pp. 1190137, vol. 5, No. 2.

D.X. Song and A. Perrig, Advanced and authenticated marking schemes for IP traceback, Proc. of INFOCOM 2001, Apr. 2001, pp. 878-886, vol. 2.

T.W. Doeppner et al., Using router stamping to identify the source of IP packets, Proc. of 7th ACM Inter. Conf. on Computer Comm. and Networks, Nov. 2000, pp. 184-189, NewYork, NY, USA: ACM Press.

A.C. Snoeren et al., Single-packet IP traceback, IEEE/ACM Trans. Networking, Dec. 2002, pp. 721-734, vol. 10, No. 6.

T. Baba and S. Matsuda, Tracing network attacks to their sources, IEEE Internet Comput., Mar./Apr. 2002, pp. 721-734, vol. 10, No. 6.

S. Matsuda et al., Design and Implementation of Unauthorized Access Tracing System, Proc. of the 2002 Symposium on Applications and the Internet, 2002, (Saint 2002), Jan./Feb. 2002, pp. 74-81.

R. Stone, Centertrack: An IP Overlay Network for Tracking DoS Floods, Proc. of 9th USENIX Security Symposium, Aug. 2000.

H. Chang et al., DecIdUouS: Decentralized Source Identification for Network-Based Intrusions, Proc. of 6th IFIP/IEEE International Syposium on Integrated Net. Management, May 1999, pp. 701-714.

H. Burch and B. Cheswick, Tracing anonymous Packets to their Approximate Source, Proc. of 2000 USENIX LISA Conference, Dec. 2000, pp. 319-327.

A. Belenky and N. Ansari, IP traceback with deterministic packet marking, IEEE. Commun. Lett., Apr. 2003, pp. 162-164, vol. 7, No. 4.

C. Shannon et al., Beyond folklore: observations on fragmented traffic, IEEE/ACM. Trans. Networking, Dec. 2002, pp. 709-720, vol. 10, No. 6.

S.F. Wu et al., On design and evaluation of 'intention-driven' ICMP Traceback, Proc. of 10th Inter. Conf. on Computer Comm. and Networks, Oct. 2001, pp. 159-165.

H. Chang et al., Design and implementation of a real-time decentralized source idetification system for untrusted ip packets, Proc. of the DARPA Information Survivability Conference & Exposition, Jan. 2000, pp. 100-111, vol. 2.

A. Belenky and N. Ansari, Tracing multiple attackers with deterministic packet marking (DPM), Proc. of IEEE PacRim, Aug. 2003, to be published.

S. McCreary and C.K. Claffy, Trends in wide area IP traffic patterns, ITC Specialist Seminar, CAIDA, 2000.

L. Subramanian et al., Characterizing the internet hierarchy from multiple vantage points, Proceeding of INFOCOM 2002 Twenty-First Annual Joint Conference of the IEEE Computer and Communications Societies, Jun. 2002, pp. 619-627, vol. 2.

S.C. Lee and C. Shields, Technical, Legal and Challenges to automated attack Traceback, IT Professional, May/Jun. 2002, pp. 12-18, vol. 4, No. 3.

D. Wei and N. Ansari, "implementing IP Traceback in the Internet—An ISP Perspective, "Proc. 3rd Annual IEEE Workshop on Information Assurance, West Point, NY, pp. 326-332, Jun. 17-19, 2002.

Y. Kim, J.-Y. Jo, and F. Merat, "Defeating Distributed Denial-of-Service Attack with Deterministic Bit Marking," IEEE GLOBECOM, pp. 1363-1367, Dec. 2003.

Andrey Belenky, "IP traceback with Deterministic Packet Marking (DPM),"Ph.D. dissertation, New Jersey Institute of Technology, Oct. 2003.

* cited by examiner

FIG. 7

*Marking procedure at router R, edge interface A:*
    for $z = 0$ to $f - 1$
        $Digest := H_z(A)$
        for $y = 0$ to $k - 1$
            $Marks[z \times k + y].\text{Hash\_num} := z$
            $Marks[z \times k + y].\text{Digest} := Digest$
            $Marks[z \times k + y].\text{Seg\_Num} := y$
            $Marks[z \times k + y].\text{A\_bits} := A[y]$
    for each incoming packet $w$
        let $x$ be a random integer from $[0, f \times k)$
        write $Marks[x]$ into $w.\text{Mark}$

*Mark Recording procedure at victim V:*
    for each attack packet $w$
        $Part := w.\text{Mark.Hash\_num}$
        $Area := w.\text{Mark.Digest}$
        $Seg := w.\text{Mark.Seg\_Num}$
        $Bit := w.\text{Mark.A\_bits}$
        $RecTbl[Part, Area, Seg, Bit] := \text{'1'}$

*Address Recovery procedure at victim V:*
    for $Area = 0$ to $2^d - 1$
        for $Bit_0 = 0$ to $2^a - 1$
            if $RecTbl[0, Area, 0, Bit_0] == \text{'1'}$ then
                ⋮
                if $RecTbl[0, Area, k-2, Bit_{k-2}] == \text{'1'}$ then
                      for $Bit_{k-1} = 0$ to $2^a - 1$
                          if $RecTbl[0, Area, k-1, Bit_{k-1}] == \text{'1'}$ then
                              $Prm := Bit_0 . Bit_1 . \ldots . Bit_{k-1}$
                              $Digest := H_0(Prm)$
                          if $Area == Digest$ then
                              for $Part = 0$ to $f - 1$
                                  for $Seg = 0$ to $k - 1$
                                        if $RecTbl[Part, H_{Part}(Prm),$
                                          ↪ $Seg, Bit_{Seg}] \ne \text{'1'}$ then
                                            $False\_flag := \text{'1'}$
                              if $False\_flag \ne \text{'1'}$ then
                                $Prm \Rightarrow IngressTbl$

FIG. 9

*Marking procedure at router R, edge interface A:*
    for $z = 0$ to $f - 1$
        *Digest:*= $H_z(A)$
        for $y = 0$ to $k - 1$
            *Marks[z × k + y]*.Hash_num := $z$
            *Marks[z × k + y]*.Digest := *Digest*
            *Marks[z × k + y]*.Seg_Num := $y$
            *Marks[z × k + y]*.A_bits := *A[y]*
    for each incoming packet *w*
        let *x* be a random integer from $[0, f \times k)$
            if *w*.MF == '1' OR *w*.offset ≠ 0 then
                if *FragTbl[SA, DA, P, ID]* == NIL then
                    create *FragTbl[SA, DA, P, ID]*
                    *FragTbl[SA, DA, P, ID]* := $x$
                else
                    $x$ := *FragTbl[SA, DA, P, ID]*
        write *Marks[x]* into *w*.Mark

FIG. 10

*Marking procedure at router R, edge interface A:*
    for $z = 0$ to $f - 1$
        *Digest:*= $H_z(A)$
        for $y = 0$ to $k - 1$
            *Marks[z × k + y]*.Hash_num := $z$
            *Marks[z × k + y]*.Digest := *Digest*
            *Marks[z × k + y]*.Seg_Num := $y$
            *Marks[z × k + y]*.A_bits := *A[y]*
    for each incoming packet *w*
        let *x* be a random integer from $[0, f \times k)$
            if *w*.MF == '1' OR *w*.offset ≠ 0 then
                if *FragTbl[SA, DA, P, ID]* == *NIL* then
                    create *FragTbl[SA, DA, P, ID]*
                    *FragTbl[SA, DA, P, ID]*.Mark_num := $x$
                    *FragTbl[SA, DA, P, ID]*.counter := 1
                else
                    if *FragTbl[SA, DA, P, ID]*.counter < 45 then
                        $x$ := *FragTbl[SA, DA, P, ID]*.Mark_num
                        *FragTbl[SA, DA, P, ID]*.counter++
        write *Marks[x]* into *w*.Mark

FIG. 11

*Marking procedure at router R, edge interface A:*
    for $z = 0$ to $f - 1$
        *Digest:*$= H_z(A)$
        for $y = 0$ to $k - 1$
            *Marks[z × k + y]*.Hash_num := $z$
            *Marks[z × k + y]*.Digest := *Digest*
            *Marks[z × k + y]*.Seg_Num := $y$
            *Marks[z × k + y]*.A_bits := *A[y]*
        for each incoming packet *w*
            let *x* be a random integer from $[0, f \times k)$
                if *w*.MF == '1' OR *w*.offset $\neq$ 0 then
                    if *FragTbl[SA, DA, P, ID]* == NIL then
                        create *FragTbl[SA, DA, P, ID]*
                        let *v* be a random integer from set {3, 44, 44}
                        *FragTbl[SA, DA, P, ID]*.Mark_num := $x$
                        *FragTbl[SA, DA, P, ID]*.counter := 1
                        *FragTbl[SA, DA, P, ID]*.Suspend := $v$
                else
                    if (*FragTbl[SA, DA, P, ID]*.counter
                      ↪    < *FragTbl[SA, DA, P, ID]*.Suspend) then
                        $x$ := *FragTbl[SA, DA, P, ID]*.Mark_num
                        *FragTbl[SA, DA, P, ID]*.counter++
        write *Marks[x]* into *w*.Mark

ACCOMODATING FRAGMENTATION WITH DETERMINISTIC PACKET MARKING

RELATED APPLICATIONS

This application claims priority from U.S. Provisional patent Applications Ser. No. 60/552,645, filed Mar. 12, 2004; Ser. No. 60/552,647 filed Mar. 12, 2004, and 60/553,212 filed Mar. 15, 2004.

FIELD OF INVENTION

This invention relates generally to methodology useful in securing the Internet infrastructure, and more specifically relates to methods for tracing internet attacks back to their source or sources.

BACKGROUND OF INVENTION

In recent years, much interest and consideration has been paid to the topic of securing the Internet infrastructure that continues to become a medium for a broad range of transactions. A number of approaches to security have been proposed, each attempting to mitigate a specific set of concerns. The specific threat, which is the main focus of this application, is anonymous attacks. In anonymous attacks, the identity of the attacker(s) is not immediately available to the victim since the Source Address (SA) field in the attack packets is spoofed. (Distributed) Denial of Service ((D)DoS) attacks are anonymous attacks, which currently attract much attention since there is no obvious way to prevent them or to trace them.

Currently there are several ways of dealing with anonymous attacks. They include source address filtering, SYN Flood Protection, and implementing a BlackHole Router server. Source address filtering, introduced in P. Ferguson and D. Senie, *Network Ingress Filtering: defeating denial of service attacks which employ IP source address spoofing*, RFC 2827, May, 2000, prevents packets with values of the SA field outside the preset appropriate range from entering the Internet. If deployed on every ingress interface, this would drastically reduce the number of anonymous packets in the Internet. Unfortunately, source address filtering incurs high overhead and administrative burden and is ineffective, unless carried out almost everywhere. SYN Flood Protection monitors half-open TCP connections and does not allow more than a certain number of them to exist simultaneously. SYN Flood protection prevents only SYN Flood type (D)DoS attacks and is useless against other types of anonymous attacks. Finally, the ISPs can determine the interface, where the DoS attack packets entered its network, by "Black Holing" a router on its network, if the customer reports the attack. This method involves human interaction, works only for the backscatter attacks, as discussed in D. Moore, G. M. Voelker and S. Savage, *Inferring Internet Denial of Service Activity*, Proc. of 10th {USENIX} Security Symposium, 2001, pp. 9-22, must be performed while the attack is still in progress, and is limited to the boundaries of the given ISP.

The currently available methods for dealing with anonymous attacks are not comprehensive. They either deal with a very limited set of the problems or are too expensive to implement and enforce. While it may be simply impossible to prevent attackers from attempting an attack, it might be possible to lessen, or even completely eliminate the effects of the attack by not allowing the packets to reach the victim(s). This is the proactive approach discussed in detail in R. K. C. Chang, *Defending against Flooding-Based Distributed Denial-of-Service Attacks: A Tutorial*, IEEE Commun. Mag, Vol. 40, No. 10, pp. 42-51, October 2002. The reality, however, is that prevention of all attacks on the Internet is far from reality. When prevention fails, a mechanism to identify the source(s) of the attack is needed to at least insure accountability for these attacks. This is the motivation for designing IP Traceback schemes.

After several high-profile DDoS attacks on major U.S. web sites in 2000, numerous IP traceback approaches have been suggested to identify the attacker(s). See A. Belenky and N. Ansari, On *IP traceback, IEEE Commun. Mag*, vol 41, no, 7, pp. 142-153, July 2003. IP Traceback is defined in Chang (op. cit.) as identifying a source of any packet on the Internet. The previously proposed schemes can be categorized in four broad groups. One group of the solutions relies on the routers in the network to send their identities to the destinations of certain packets, either encoding this information directly in rarely used bits of the IP header, or by generating a new packet to the same destination. The biggest limitation of solutions of this type is that they are focused only on flood-based DoS and DDoS attacks, and cannot handle attacks comprised of a small number of packets. Moreover, for large scale DDoS attacks, these schemes are not very effective.

The second group involves logging some fields of every packet, or the digest of every packet on all the routers that a packet traverses. During the traceback, all of the routers are polled and the path of a given packet is reconstructed by correlating the routers, which have stored the information about this packet. The solutions of this group are not easily scalable, have relatively high ISP involvement, and have no post-mortem traceback capabilities. The third group involves the centralized management of the traceback process and changing the routing in the network with tunneling to be able to identify the packets' origin. The shortcomings of these schemes are high ISP involvement and high bandwidth and processing overhead associated with tunneling. The final group is referred to as the state of network inference schemes. Controlled flooding, described in H. Burch and B. Cheswick, *Tracing Anonymous Packets to Their Approximate Source*, Proc. of 2000 USENIX LISA Conference, December 2000, pp. 319-327, is the only scheme in this group. The scheme only works for DoS attacks. The attack path is determined while the attack is still in progress by systematically loading different links on the network and observing the effect on the victim. If loading of a particular link results in decrease in the rate of the attack traffic, then this link is on the attack path. Controlled flooding is limited to tracing DoS attacks only, and it is manual. It also utilizes a questionable approach of inducing DoS attacks for the purposes of traceback.

SUMMARY OF INVENTION

Now in accordance with the present invention a method for IP Traceback is disclosed which is based on Deterministic Packet Marking (DPM), and which provides accommodation for fragmentation. The approach is scalable, simple to implement, and introduces no bandwidth and practically no processing overhead on the network equipment. It is capable of tracing thousands of simultaneous attackers during a DDoS attack. Given sufficient deployment on the Internet, DPM is capable of tracing back to the slaves responsible for DDoS attacks that involve reflectors. Tracing back to the slaves cannot be done by other existing schemes. This aspect of DPM is further disclosed in our concurrently filed U.S. patent application, Ser. No. _____, the entire disclosure of which is incorporated herein by reference. Most of the processing is done at the victim. The traceback process can be performed post-mortem allowing for tracing the attacks that may not have been noticed initially, or the attacks which would deny service to the victim so that traceback is impossible in real time. The involvement of the Internet Service Providers (ISPs) is very limited, and changes to the infrastructure and operation required to deploy DPM are minimal. DPM performs the traceback without revealing the internal topology of the provider's network, which is a desirable quality of a traceback scheme.

With regard to accommodating fragmentation, it is required that the ID field (as well as some other fields) of all the fragments in a given series is the same. DPM randomly selects the marks from the pool, which is created at startup. The mark completely occupies the ID field in the IP packet header, as well as Reserved Flag. Since every single packet passing through the DPM-enabled interface is marked, the ID field of all the fragments of a series are ensured to be the same. By allowing DPM to suspend randomness in selecting the marks for the fragments of a series, all fragments are ensured to have the same ID. This ID would be different from the one originally set by the origin of the packet, but this would not make a difference for the reassembly process.

DESCRIPTION OF DRAWINGS

The invention is diagrammatically illustrated, by way of example, in the drawings appended hereto, in which:

FIG. 7 shows the pseudo code for the modified multiple digest DPM algorithm;

FIG. 9 shows the pseudo code for the fragment-persistent DPM;

FIG. 10 shows the pseudo code for the fragment-persistent DPM with fragment counters; and FIG. 11 shows the pseudo code for the practical compromise fragment-persistent DPM.

DESCRIPTION OF PREFERRED EMBODIMENTS

The basic DPM is a packet marking algorithm. We first consider the general principle behind DPM and discusses the most basic implementation of the scheme.

By "Deterministic Packet Marking" we refer to the fact that every packet traversing a DPM-enabled router is marked, i.e., the packet is inscribed with partial information of the router interface, as opposed to "Probabilistic Packet Marking" in which each packet is marked by a router along the traversed path with a probability, say, 0.04 (4%), i.e., some packets may not be marked at all.

The two key assumptions applicable to the method are (1) that an attacker may generate any packet; and (2) that routers are both CPU and memory limited.

Figure 1:
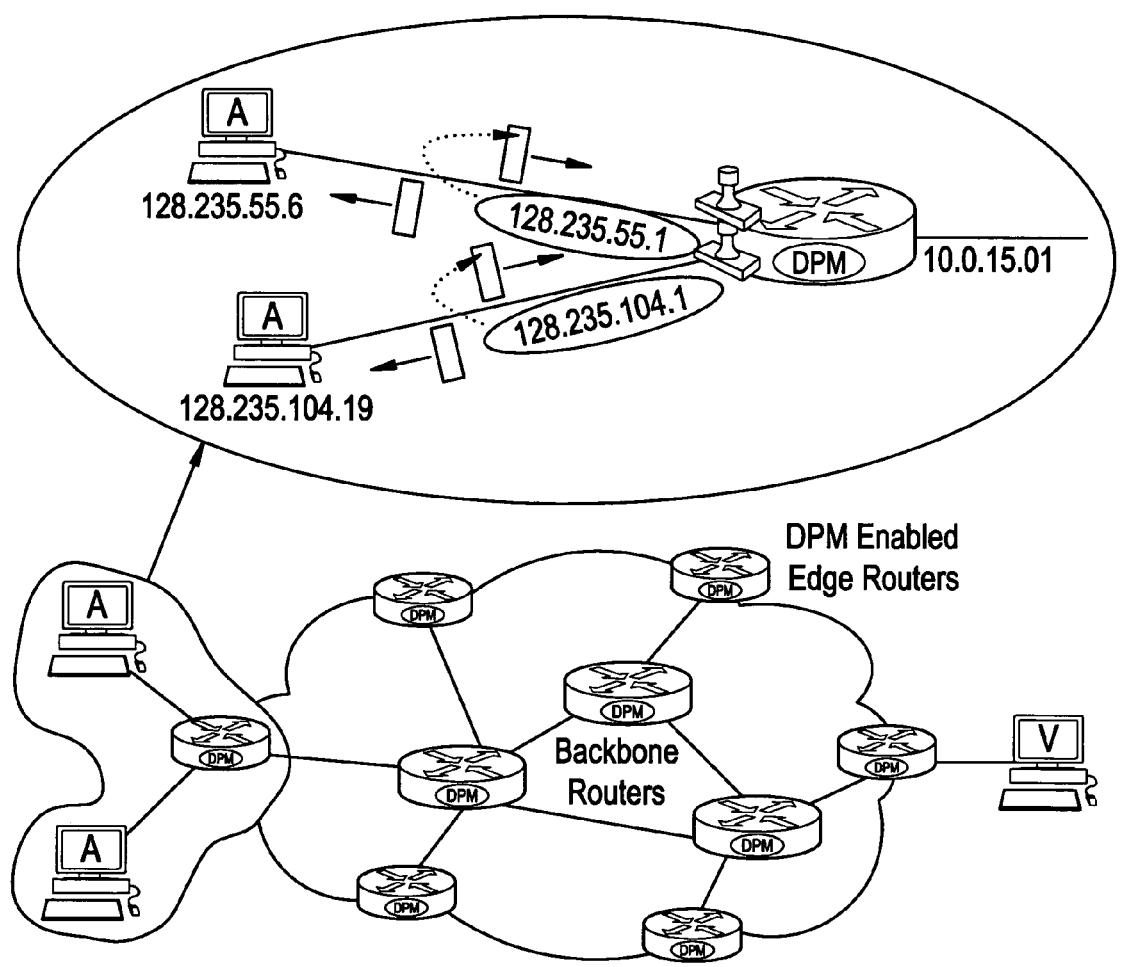
FIG. 1 depicts the method for basic deterministic packet marking (DPM)

The 16-bit packet Identification (ID) field and 1-bit Reserved Flag (RF) in the IP header are used to mark packets. Each packet is marked when it enters the network. This mark remains unchanged for as long as the packet traverses the network. This automatically removes the issue of mark spoofing which other marking schemes have to account for. The packet is marked by the interface closest to the source of the packet on an edge ingress router, as shown in FIG. 1. The routers with the engraved "DPM" signify the routers with DPM enabled, and the rubber-stamps signify the interfaces on these routers that actually perform the marking. The mark contains the partial address information of this interface, and will be addressed later herein. The interface makes a distinction between incoming and outgoing packets. Incoming packets are marked; outgoing packets are not marked. This ensures that the egress router will not overwrite the mark in a packet placed by an ingress router.

For illustrative purposes, assume that the Internet is a network with a single administration. In this case, only interfaces closest to the customers on the edge routers will participate in packet marking. Every incoming packet will be marked. Should an attacker attempt to spoof the mark in order to deceive the victim, this spoofed mark will be overwritten with a correct mark by the very first router the packet traverses. A continuous perimeter of DPM enabled interfaces should be maintained. The deployment should start with the largest, tier-1, ISPs and expand in concentric circles until the ingress interfaces are enabled. When an interface becomes enabled, other interfaces, which are closer to the tier-1 ISPs and are traversed by the marked packets should be disabled.

Procedure

A 32-bit IP address needs to be passed to the victim. A total of 17 bits are available to pass this information: 16-bit ID field and 1-bit RF. Clearly, a single packet would not be enough to carry the whole IP address in the available 17 bits. Therefore, it will take at least two packets to transport the whole IP address. An IP address is split into two segments, 16 bits each: segment 0—bits 0 through 15, and segment 1—bits 16 through 31. The marks are prepared in advance in order to decrease the per packet processing. Each mark has two fields: Segment Number and Address bits. With equal probability, the 17-bit field comprised of the ID field and RF of each incoming packet will be populated with either of those two marks.

Figure 2:
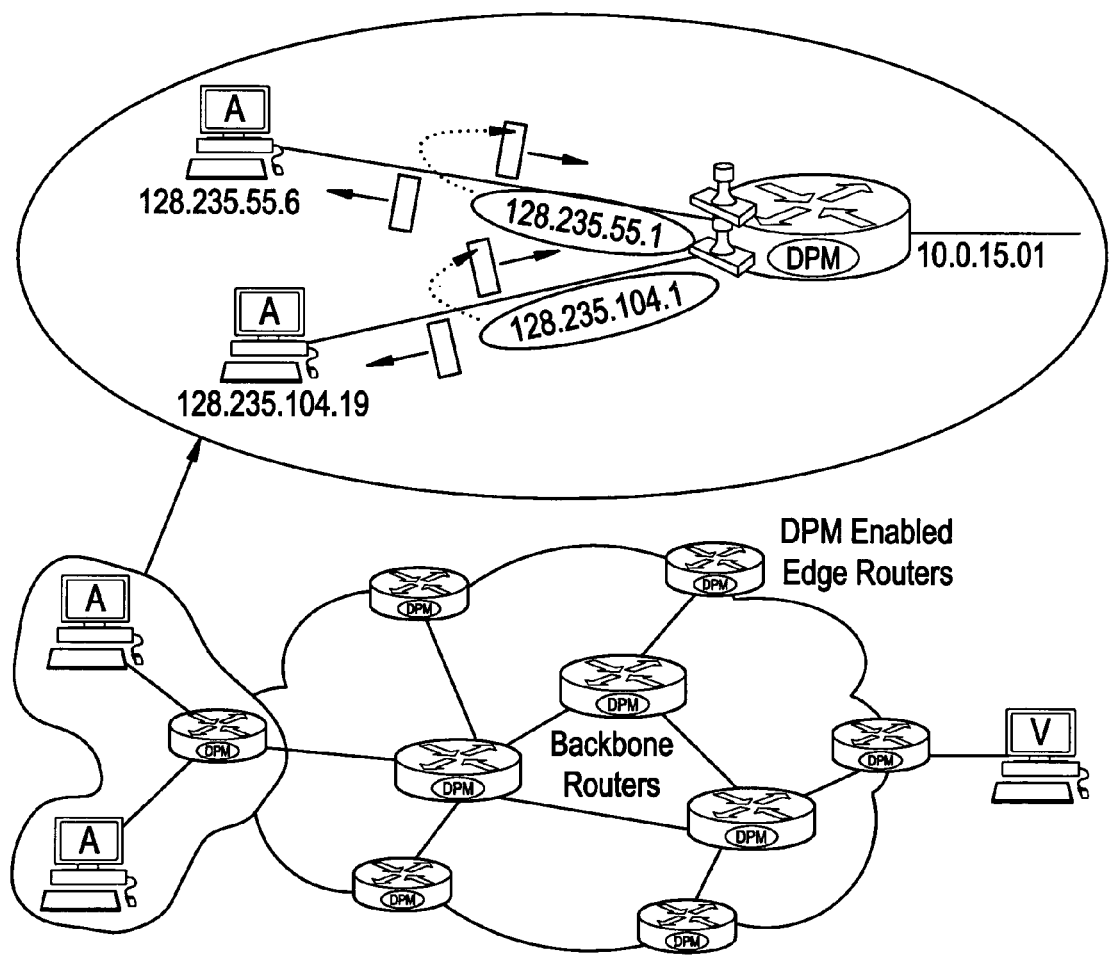
FIG. 2 illustrates the Pseudo code for the basic DPM.

At the victim, a table matching the source addresses to the ingress addresses is maintained. When a marked packet arrives at the victim, the victim will first determine if the given packet is an attack packet. If it is, the victim would check to see if the table entry for a source address of this packet already exists, and create it if it does not. Then, it writes address bits of the segment into the corresponding bits of the ingress IP address value. After both segments corresponding to the same ingress address have arrived at the destination, the ingress address for a given source address becomes available to the victim. The details of the procedure are shown in FIG. 2.

Multiple Attackers and IP Source Address Inconsistency

The limitation of the basic DPM in handling a certain type of DDoS attacks lies in the fact that the destination would associate segments of the ingress address with the source address of the attacker. If it could be guaranteed that only one host participating in the attack has a given source address, even though it might have been spoofed, and that the attacker would not change its address during the attack, the basic DPM would be sufficient. There are two situations when the reconstruction procedure of the basic DPM is inadequate. First, is the situation where two hosts with the same SA attack the victim. The ingress addresses corresponding to these two attackers are $A_0$ and $A_1$, respectively. The victim would receive four address segments: $A_0[0]$, $A_0[1]$, $A_1[0]$, and $A_1[1]$. The victim, not being equipped to handle such attack, would eventually reconstruct four ingress addresses since four permutations are ultimately possible: $A_0$ [0]. $A_0$ [1], $A_0$ [0].$A_1$ [1], $A_1$ [0].$A_0$ [1], and $A_1$ [0].$A_1$ [1], where '.' denotes concatenation. Only two of the four would be valid.

A typical metric of evaluation of the traceback schemes for DDoS attacks is the rate of false positives or false positive rate. In the context of DPM, a false positive is defined as an incorrectly identified ingress address. The rate of false positives refers to the ratio of the incorrectly identified ingress addresses to the total number of identified ingress addresses. In the above example, the false positive rate for that particular attack is 50%. Clearly, the false positive rate would increase even further if the number of attackers, with the same SA, was larger.

Second, consider a (D)DoS attack, where the attackers change their source addresses for every packet they send. The basic DPM will be unable to reconstruct any valid ingress addresses since none of the entries in the IngressTbl would have a complete ingress address.

General Principle of Handling DDoS Attacks

A general principle in handling (D)DoS attacks of these types is to rely only on the information transferred in the DPM mark. The DPM mark can be used to not only transfer the bits of the ingress address but also some other information. This additional information should enable the destination to determine which ingress address segments belong to which ingress address.

The reconstruction procedure utilizes the data structure called Reconstruction Table (RecTbl). The destination first puts the address segments in RecTbl, and then only after correctly identifying the ingress address out of the many possible address segments permutations, transfers it to IngressTbl.

Single Digest Modification to DPM

The scheme described here utilizes a hash function, H(x). To simplify the performance analysis, the hash function is assumed to be ideal. It is also assumed that the hash function is known to everybody, including all DPM-enabled interfaces, all destinations which intend to utilize DPM marks for traceback, and the attackers. The constraint of 17 bits still remains, and so a longer digest would result in fewer bits of the actual address transmitted in each mark, and consequently, the higher number of packets required for traceback.

Mark Encoding

In the basic DPM, the ingress address was divided into two segments. In this modified scheme, the ingress address is divided into k segments. Also, more bits are required to identify the segment. Instead of a single bit required for two segments in the basic DPM, $\log_2(k)$ are required for this scheme. The remaining bits are be used for the digest. Independently of which segment of the address is being sent to the victim, the digest portion of the mark will always remain the same for a given DPM interface. This enables the victim to associate the segments of the ingress address with each other to reconstruct the whole address.

Figure 3:
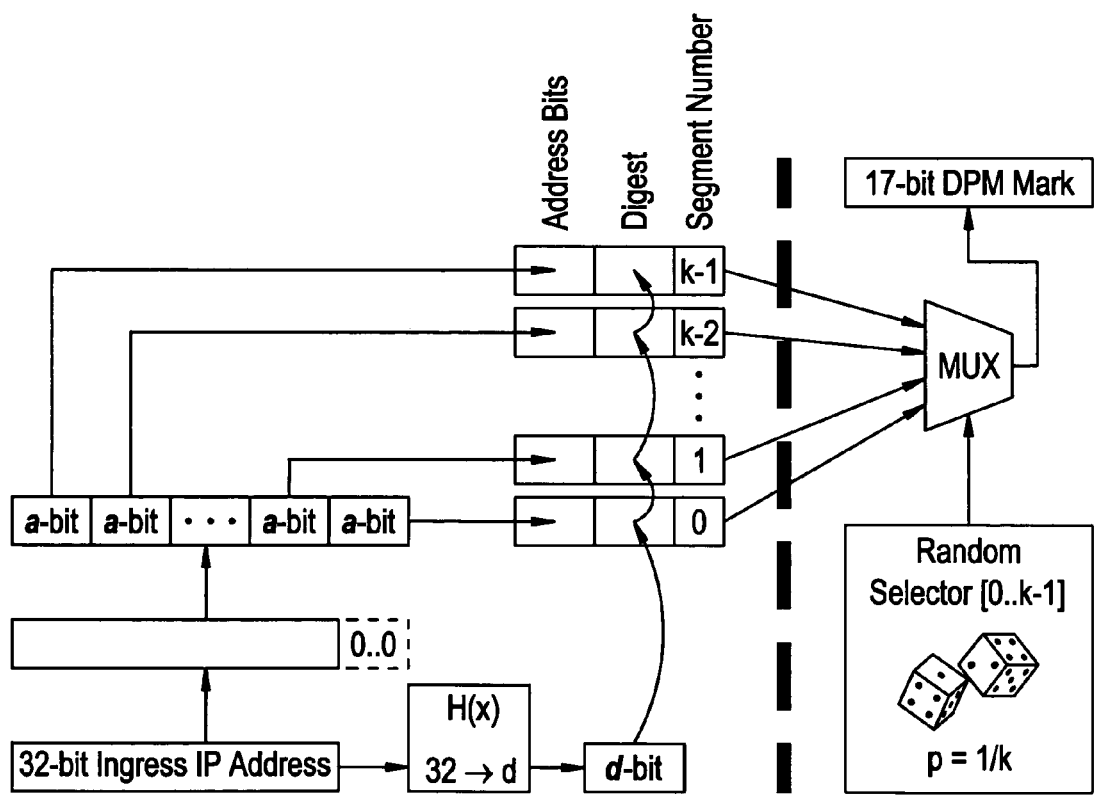
FIG. 3 depicts mark encoding for single digest DDoS modification.

FIG. 3 shows the schematics of the approach. The DPM mark consists of three fields: a-bit address segment field, d-bit digest field, and s-bit segment number field. Some padding may be required so that the address is split into segments of equal length.

At startup the DPM-enabled interface prepares k marks for all segments of the address. A d-bit hash value, or digest, of the ingress address is calculated once and then inserted in the digest field of every mark. Each of the k marks has address bits set to a different segment of the ingress address. The segment number field is set to the appropriate value. These operations are shown to the left of the bold dotted line in FIG.

3. The processing required for every packet will be limited to generating a small random number from 0 to k−1 and inserting a corresponding mark into the packet header.

Reconstruction by the Victim

The reconstruction procedure of this scheme consists of two separate processes: Mark Recording and Ingress Address Recovery. The reason for separating these two tasks is that the attack packets may arrive at the destination faster than they can be analyzed. The mark recording process sets the appropriate bits in RecTbl to indicate which marks have arrived at the destination. Address recovery checks those bits, composes address segment permutations, and determines which ones are valid ingress addresses.

Figure 4:
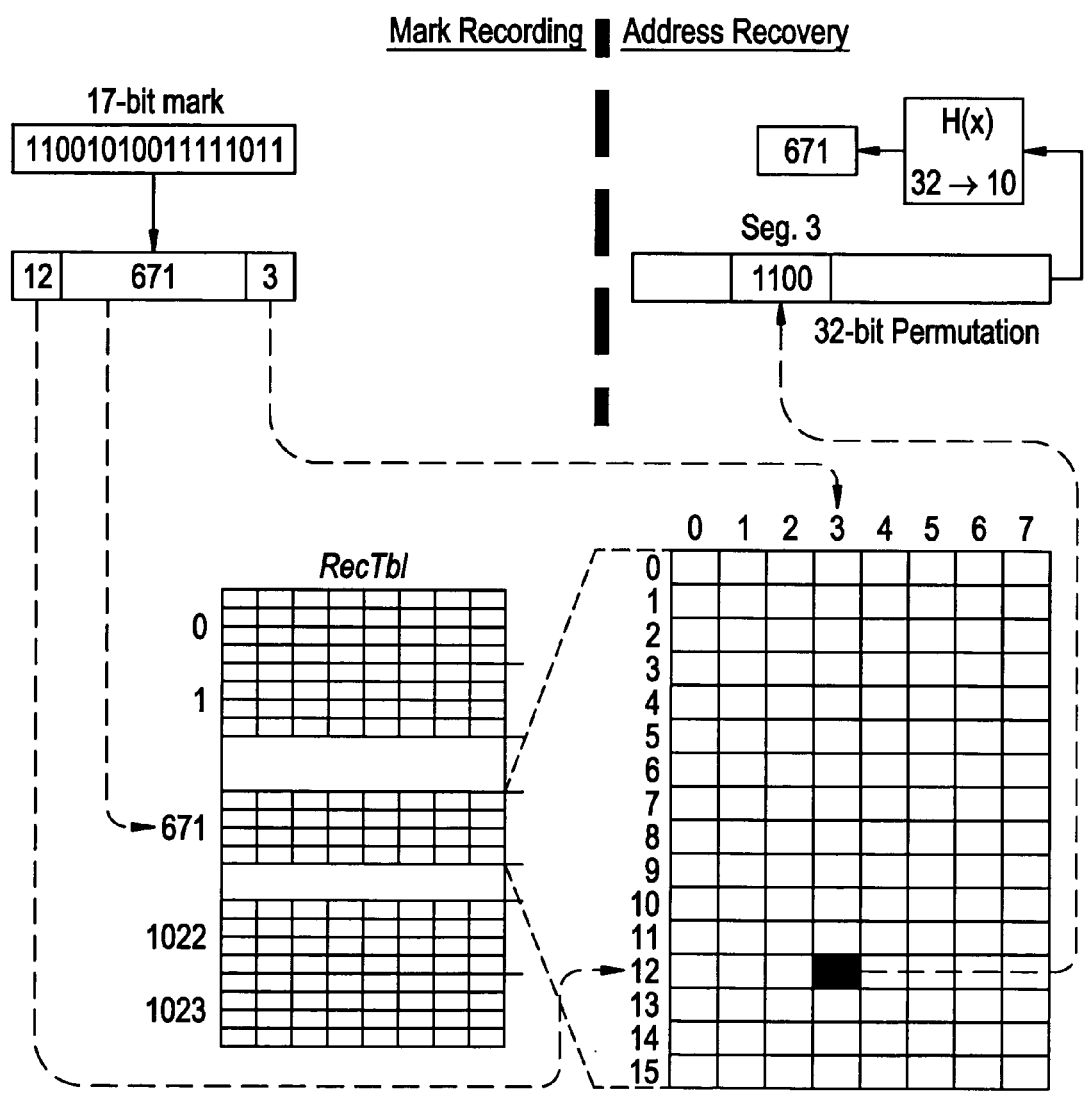
FIG. 4 illustrates RecTbl with k=8, d=10, a=4; mark recording; and address recovery.

RecTbl is a $2^{17}$ bit structure, where every possible mark can be uniquely represented. It consists of $2^d$ areas. Each area consists of k segments, and each segment consists of $2^a$ bits. FIG. 4 shows an example of RecTbl, where k, d, and a are 8, 10 and 4, respectively. When a mark becomes available to the mark recording process, it sets the appropriate bit in the RecTbl. For a given attacker, the ingress address can possibly be hashed into $2^d$ digest values. The digest is extracted from the mark and the area where the bit will be set is determined. The segment number field in the mark indicates the segment in the RecTbl area, where the appropriate bit would be set. Finally, the value of the address bits in the mark indicates the actual bit, which will be set to '1'. This process is repeated for every mark.

The address recovery process is a part of a larger traceback procedure. It analyzes each area of the RecTbl. Once again, it runs independently from the mark recording process, thus allowing post-mortem traceback. The value of a certain bit in RecTbl indicates that the corresponding mark has arrived at the victim. For example, bit 12 in segment 3 of area 671 set to '1' means that there is an ingress address of interest, with digest of 671 having segment 3 equal to '1100'$_2$ as shown in FIG. 4. This segment has to be combined with other segments of this area in order to create permutations of segments. Hash function, H(x), is applied to each of these permutations. If the result matches the area number, which is actually the digest embedded in the marks (in this example 671), then the recovery process concludes that this permutation of segments is in fact a valid ingress address.

Analysis

Regarding the number of attackers, N, that this modified scheme can traceback with the false positive rate limited to 1%, we first consider the origin of false positives. If there is only one ingress address with a given digest, there will be no false positives; however, as N increases, the chance of the digest repeated for another address also increases. The expected number of digests for a certain number of N can be thought of as the expected number of the faces turning up on a $2^d$-sided die after N throws. This is a special case of a classical occupancy problem. See W. Feller, *An Introduction to Probability Theory and Its Applications*, John Wiley & Sons, Inc., 1968. The expected number of different digests, E[H], is:

$$E[H] = 2^d - 2^d \left(1 - \frac{1}{2^d}\right)^N. \quad (1)$$

Therefore, the rate of false positives is 0 for the values of N, for which the expected number of digests, E[H], equals to N, since every ingress address will have a unique digest.

Since there may be more than one address resulting in the same digest, each segment associated with a given digest would have a certain number of values. For example, if two addresses have the same digest, segment 0 in the area of the RecTbl corresponding to this digest could have either one or two bits set to '1'. If segment 0 in these two addresses is the same, then there would be only one bit set to '1', and if segment 0 of one address is different from segment 0 of the second address, then two bits will be set to '1'. The expected number of values that a segment will assume can also be thought of as the expected number of the faces turning up on a $2^a$-sided die after $N_d$ throws [Feller, op. cit.], where $N_d$ is the number of ingress addresses with the same digest. The expected number of different values the segment will take is $$2^a - 2^a\left(1 - \frac{1}{2^a}\right)^{N_d}, \quad (2)$$

for those areas, which have segments of more than one ingress addresses, and 1 for those which have segments of only a single ingress address. The expected number of all permutations of address segments for a given digest is $$\left[2^a - 2^a\left(1 - \frac{1}{2^a}\right)^{N_d}\right]^k.$$

Recall that after a permutation of segments is obtained, the hash function H(x) is applied to it, and if the result does not match the original digest, that permutation is not considered. The expected number of permutations that result in a given digest for a given area of the RecTbl is $$\frac{\left[2^a - 2^a\left(1 - \frac{1}{2^a}\right)^{N_d}\right]^k}{2^d}.$$

The number of false positives for a given area would be the total number of permutations, less the number of valid ingress addresses, which match the digest. For this modification, just a few areas, which have segments of more than one ingress addresses, will produce more than 0.01N of false positives. We assume that for all those areas $N_d$=2. The number of those areas is N−E[H], and the number of valid ingress addresses with segments in those areas is 2(N−E[H]). The number of false positives is given by $$\frac{(N - E[H])\left[2^a - 2^a\left(1 - \frac{1}{2^a}\right)^2\right]^k - 2(N - E[H])}{2^d} \quad (3)$$

This number has to be less than 1% of N. Therefore, Eq. (eq:singlenumfp) has to be set to be less or equal to 0.01N, and solved for N. Recall that a, d, and E[H] can be expressed in terms of k. The maximum N, $N_{MAX}$, which would satisfy this inequality, is difficult to be expressed in terms of k. However, it is possible to find $N_{MAX}$ by substitution. Table tab:single provides the values of $N_{MAX}$ for selected k. Another important consideration is the expected number of datagrams required for reconstruction. This number is related to k, the number of segments that the ingress address was split. The larger the k, the more different packets it would be required for the victim to receive in order to reconstruct the ingress address. The expected number of datagrams, E[D], required to be marked by a single DPM-enabled interface in order for the victim to be able to reconstruct its ingress address is given by the Coupon Collector problem [Feller op. cit.]:

$$E[D] = k\left(\frac{1}{k} + \frac{1}{k-1} + \ldots + 1\right).$$

Table I provides the value of E[D] for selected values of k.

TABLE I

| k | a | s | d | $N_{MAX}$ | E[D] |
|---|---|---|---|---|---|
| 2 | 16 | 1 | 0 | 1 | 3 |
| 4 | 8 | 2 | 7 | 26 | 9 |
| 8 | 4 | 3 | 10 | 108 | 22 |
| 16 | 2 | 4 | 11 | 45 | 55 |
| 32 | 1 | 5 | 11 | 45 | 130 |

Multiple Digest DDoS Modification to DPM

In the scheme described above, a single hash function, H(x), was used for identifying segments of an ingress address. While this allows for identifying several ingress addresses of simultaneous attackers, this number is not sufficient for the real attacks. A modification, requiring a family of hash functions, is now considered.

Mark Encoding

In this scheme, the family of $f$ hash functions, $H_0(x)$ through $H_{f-1}(x)$, is used to produce $f$ digests of the ingress address. As in the single digest scheme, the address segment and the segment number are transferred in each mark. Instead of the single digest, however, one of the several digests produced by each of $f$ hash functions concatenated with the function identifier is embedded in the mark. The d-bit field, which was used solely for the digest in the single-digest scheme, is split into two fields: $\log_2(f)$-bit long field carrying the identifier of the hash function, and d-bit field with the digest itself.

Figure 5:
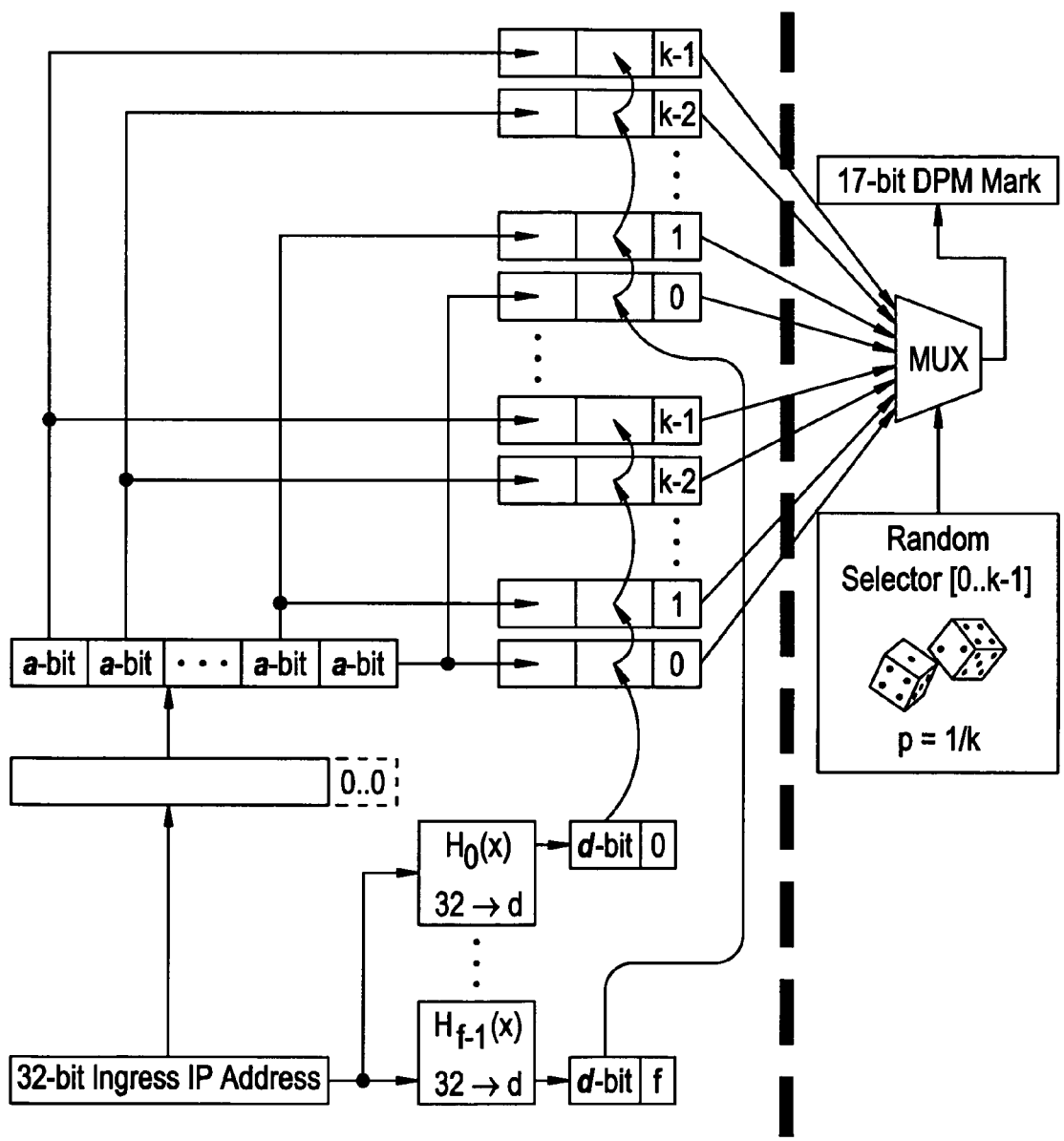
FIG. 5 shows encoding for multiple digest DDoS modification.

FIG. 5 illustrates the process of the mark encoding. The process is very similar to the one described in the single digest modification, but differs in that for every ingress address, not k, but f×k marks have to be created at startup and then randomly selected for every packet. This does not affect the DPM-enabled interface per-packet overhead since per-packet will be limited to generating a small random number and overwriting 17 bits in the header, just as for the single-digest or basic DPM schemes.

Reconstruction by the Destination

Reconstruction by the destination is also similar to that described in the single digest modification. The structure of RecTbl has to be changed slightly. The RecTbl will consist of $f$ smaller parts. Every one of those parts will have the structure identical to the RecTbl described in Section sec:MultSingleReconstruction ($2^d$ areas, k segments in every area, and $2^a$ bits in every segment). The mark recording process first examines the hash function identifier field. Then it proceeds to the corresponding part of the RecTbl. Having identified the part in the RecTbl, the area, and the segment, the appropriate bit is set to '1', as in the single-digest scheme.

Figure 6:
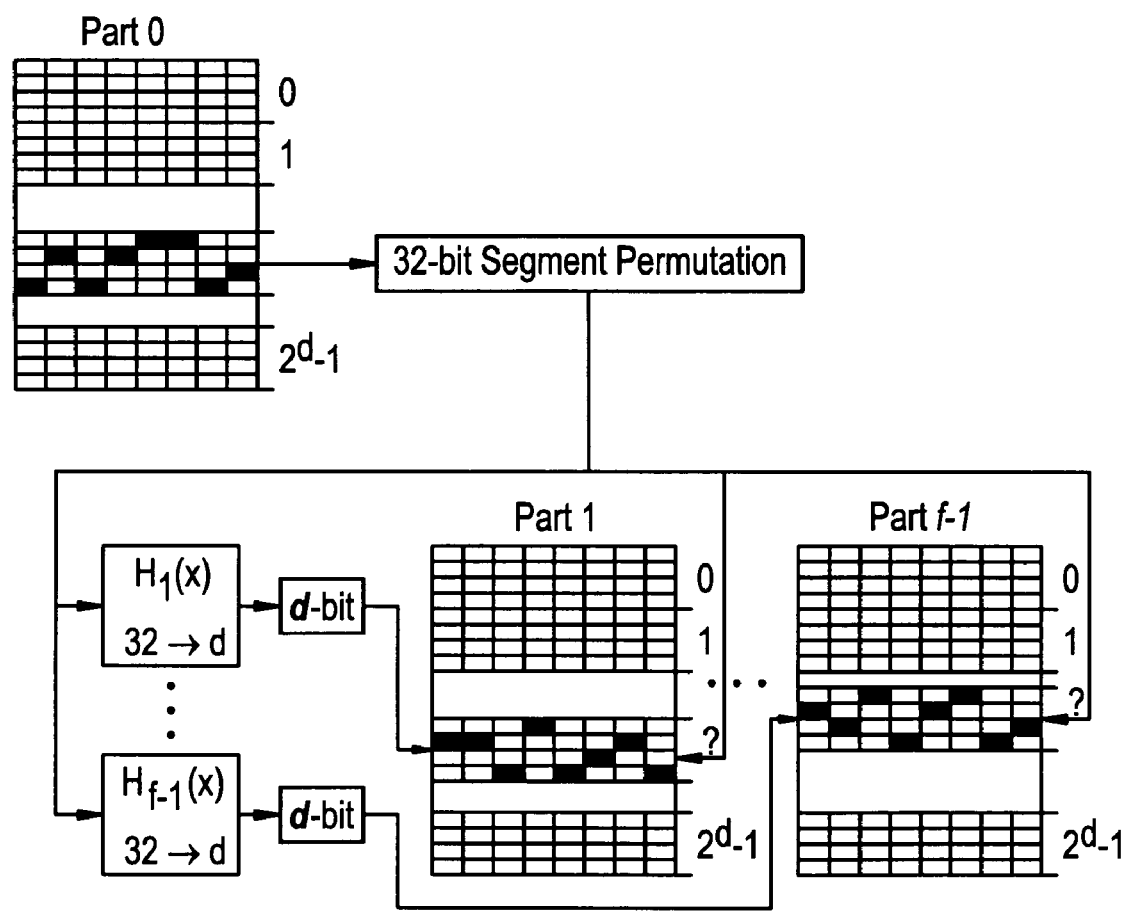
FIG. 6 illustrates address recovery for the multiple digest DDoS modification.

The address recovery process, shown in FIG. 6, identifies the permutations which match the digest in areas of Part0 of RecTbl. Once a permutation is validated by comparing its digest obtained by applying $H_0(x)$ to the area number, the rest of the hash functions, $H_1(x)$ to $H_{f-1}(x)$, are applied to it to produce f−1 digests. These digests are used to verify the existence of this permutation in other parts of RecTbl. The process then checks these areas of the remaining parts for the permutation in question. If the permutation is present in the appropriate area of every part of the RecTbl, it is concluded that the permutation is a valid ingress address. Notice that the permutation does not have to be verified in every part. It is known that the digest obtained by applying $H_i(x)$ to the permutation being checked will match the area number since the area was identified by this operation. Therefore, such verification would be redundant and will always produce a positive outcome. The pseudo code in FIG. 7 provides the details of the mark encoding, mark recording, and address recovery processes.

Analysis

Again here we consider for this scheme that the purpose remains the same: to find $N_{MAX}$, the maximum number of simultaneous attackers, which can be traced back with the false positive rate not exceeding 1%. For the multiple digest scheme, the number of false positives in one area of RecTbl can be higher than in a single digest scheme because the same false positive has to appear in the appropriate areas of all other parts of RecTbl in order to be identified as an ingress address.

Recall, from the single digest case, that the expected number of permutations in a given digest is given by $$\left[2^a - 2^a\left(1 - \frac{1}{2^a}\right)^{N_d}\right]^k,$$

where $N_d$ is the number of ingress addresses with this digest. Since for the multiple digest scheme, unlike the single digest scheme, the number of ingress addresses with the same digest will be more than 2, the following analysis is more suitable. The number of ingress addresses with the same digest is $$\frac{N}{E[H]}.$$

The number of permutations in a single digest is then $$\left[2^a - 2^a\left(1 - \frac{1}{2^a}\right)^{\frac{N}{E[H]}}\right]^k.$$

The number of false positives for this digest is $$\frac{\left[2^a - 2^a\left(1 - \frac{1}{2^a}\right)^{\frac{N}{E[H]}}\right]^k - N}{2^d}.$$

The number of false positives in Part0 is given by:

$$\frac{E[H]}{2^d}\left(\left[2^a - 2^a\left(1 - \frac{1}{2^a}\right)^{\frac{N}{E[H]}}\right]^k - N\right).$$

For large values of N, $E[H]=2^d$, and thus $$\frac{E[H]}{2^d} = 1.$$

So the number of false positives in Part0 is $$\left[2^a - 2^a\left(1 - \frac{1}{2^a}\right)^{\frac{N}{E[H]}}\right]^k - N. \quad (4)$$

Once the permutation was identified as a possible ingress address in Part0, the remaining digests are calculated. Since we assume uniform distribution of addresses, any permutation is as likely to appear as any other. The probability of any random permutation to appear is $$\frac{1}{2^{32}}.$$

The probability that a given permutation, which is a false positive, will occur in the appropriate area of Part1 is:

$$\frac{\left[2^a - 2^a\left(1 - \frac{1}{2^a}\right)^{\frac{N}{E[H]}}\right]^k}{2^{32}}.$$

This expression is not divided by $2^d$ because if the permutation in question is present in the identified areas of all other parts, it must match the appropriate digest per discussion at the end of Section sec:MultMultipleReconstruciton. The probability that a given permutation will occur in the appropriate areas of all parts of RecTbl is:

$$\left[\frac{\left[2^a - 2^a\left(1 - \frac{1}{2^a}\right)^{\frac{N}{E[H]}}\right]^k}{2^{32}}\right]^{f-1}.$$

Multiplying this expression by the number of false positives in Part0 results in the number of false positives, after areas matching the digests 1 through f-1 in all the other parts of the RecTbl were checked. This is the total number of false positives for the RecTbl. Setting it not to exceed $$\frac{N}{100}$$

results in the following inequality:

$$\frac{\left\{\left[2^a - 2^a\left(1 - \frac{1}{2^a}\right)^{\frac{N}{E[H]}}\right]^k\right\}^f}{2^{32(f-1)}} \leq \frac{N}{100}$$

Recall that a, d, and E[H] can be expressed in terms of k. So, the whole inequality can be expressed in terms of k and f. Similar to the single-digest scheme, $N_{MAX}$ can be found by substitution.

The expected number of datagrams required to reconstruct the ingress address is now given by $$E[D] = f \times k \left( \frac{1}{f \times k} + \frac{1}{f \times k - 1} + \ldots + 1 \right).$$

Table II provides the values of $N_{MAX}$ and E[D] for selected combinations of f, a, k, and d.

TABLE II

| F | k | a | d | $N_{MAX}$ | E[D] |
|---|---|---|---|-----------|------|
| 4 | 8 | 4 | 8 | 2911 | 130 |
| 4 | 4 | 8 | 5 | 2296 | 55 |
| 8 | 4 | 8 | 4 | 2479 | 130 |

The multiple digest modification is able to reconstruct more ingress addresses of simultaneous attackers than a single digest modification without increasing E[D].

Accommodating IP Fragmentation

According to recent studies fragmented traffic constitutes between about 0.25% and 0.5% of the total IP traffic. Though the amount of fragmented traffic is small, it does exist. The Deterministic Packet Marking (DPM) scheme, discussed so far herein, does not differentiate between fragmented and non-fragmented traffic. The ID Field, which is used for fragmentation, and RF of the IP header are completely replaced with one of f×k marks chosen at random in every packet. The ID field is used only for the reassembly of the fragmented traffic.

If fragmented traffic passes through the DPM interface, it will not be properly reassembled by the destination because the ID field would be changed. When DPM encounters fragments, it suspends the randomness in selecting the mark, and assigns the same mark to every fragment in the original series.

This results in the improved ratio of correctly reassembled fragmented traffic at the destination. Only about 0.3% of all fragmented traffic will be reassembled incorrectly due to DPM with this modification. The undesirable effect of this modification is the increased expected number of packets required for the reconstruction of the ingress address for the fragmented traffic, E[Pkt]. For the fragmented traffic, E[Pkt]= C×E[D], where C is the fragmentation coefficient and is equal to 3. E[Pkt]=E[D] for the not fragmented traffic. This increase becomes critical since that attacker may be able to utilize artificial fragmentation—generate packets which appear to be fragments for the purpose of obstructing the traceback. The effect of artificial fragmentation will be discussed further below.

IP Fragmentation Background and Terminology

Figure 8:
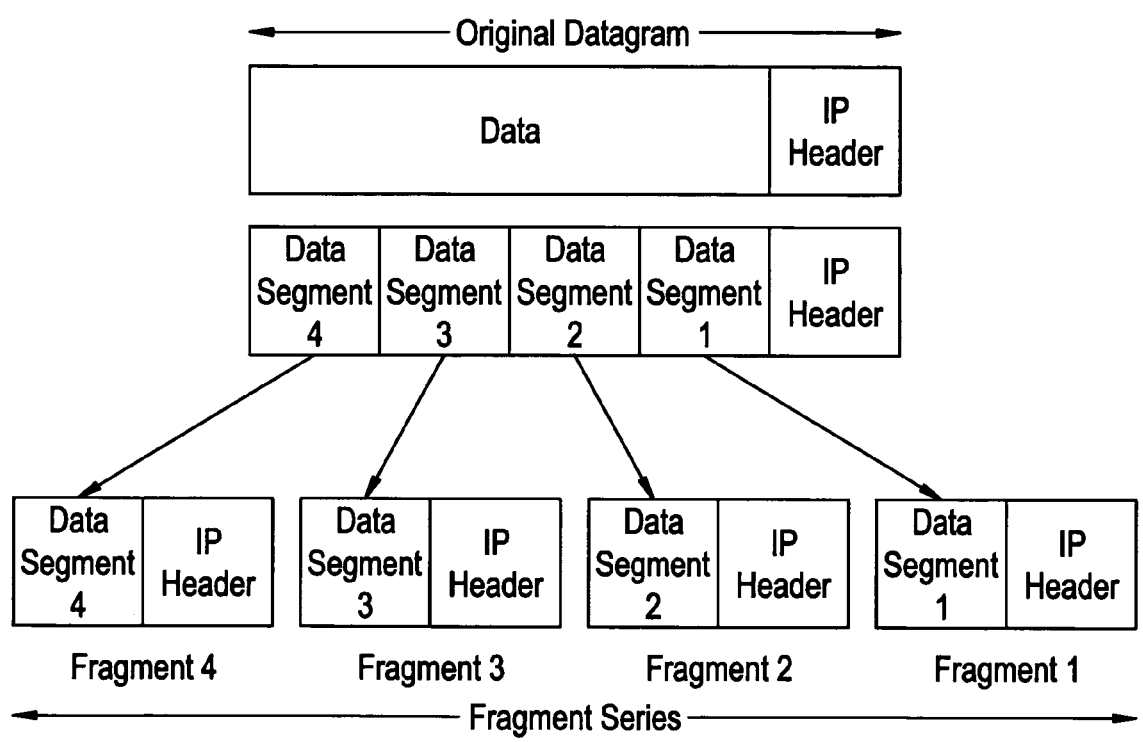
FIG. 8 is a diagram depicting IP fragmentation.

Fragmentation is a feature of IP to enable transport of packets across the networks with different Maximum Transfer Unit (MTU). Path MTU is the smallest MTU of all the links on a path from a source host to a destination host as described in Mogul and Deering, "Path MTU discovery", Request for Comments (RFC) 1191, November 1990. When a packet enters a network, the MTU for which is smaller than the packet length, the packet has to undergo a process of fragmentation. FIG. 8 illustrates this process and introduces several important terms. "Original datagram" is an IP datagram that will be fragmented because its size exceeds the MTU of the next link. A "Packet Fragment", or simply a "fragment", refers to a packet containing a portion of the payload of an original datagram. While the datagram and packet are synonymous, the terms, "original datagram" and "packet fragment", will be used for clarity. A "fragment series", or simply a "series", is an ordered collection of fragments that results from a single original datagram.

When fragmentation occurs, each fragment becomes a valid IP packet. All the fragments have their own IP header. Most of the fields of the IP header of the fragments are inherited from the original datagram IP header. The fields of interest are ID field, Flags, and Offset. ID field is copied from the original datagram to all the fragments. The SA, Destination Address (DA), Protocol (P), and ID, are used by the destination to distinguish the fragments of different series according to J. Postel, "Internet protocol" RFC 791, September 1981 and D. D. Clark, "IP datagram reassembly algorithms" RFC 815, July, 1982. The ID field of all the fragments, which resulted from a single datagram, must have their ID field in the IP header set to the same value for proper reassembly. More Fragments (MF) flag is set to '1' in every fragment except the last one. This flag indicates that more fragments to follow. The last fragment has MF set to '0' to indicate that it is the last fragment in the series. Finally, the offset field of the IP header is set to the position of the data in the fragment with respect to the beginning of data in the original datagram. The unit of offset is eight bytes.

For successful reassembly, the destination has to acquire all of the fragments of the original datagram. A tuple (SA, DA, P, ID) is used to determine if the fragments belong to the same original datagram, MF is used to indicate the number of fragments, and Offset is used to determine the correct order of reassembly. Notice that the fragments may come out of order but reassembly will still be successful because the destination would be able to determine that the fragment belongs to a given series, and its position relative to other fragments.

Since DPM uses the ID field for its purposes, the reassembly errors at the destination may occur. First the effects of the basic DPM on reassembly are examined and then the techniques to avoid the undesirable effects are introduced. The performance of the techniques is analyzed in terms of the probability of reassembly error.

Shortcomings of DPM Related to Fragmentation

Fragmentation can happen upstream or downstream from the point of marking. These two situations have to be considered separately.

Upstream Fragmentation

Upstream fragmentation is known to the DPM-enabled interface. The DPM-enabled interface can identify a packet to be a fragment by examining its MF and Offset.

In the case of upstream fragmentation, a datagram is fragmented by a router or a host before it reaches the DPM-enabled interface. When a series of fragments of the original datagram reaches the DPM-enabled interface the ID and RF fields of all the fragments will be replaced with one of the f×k marks picked at random. This will cause fragments to have different ID fields when they arrive to the destination. Fragments with different ID fields will be considered to be parts of different datagrams. The reassembly will eventually timeout since the destination will never get all the fragments necessary for the reassembly of what it considers to be two separate series. The probability of all fragments in a series of two fragments having the same ID field after marking is (1/(fk)). For a series of three packets, (1/((fk)²)), etc. For f×k=16, the probability of a series consisting of two fragments being correctly reassembled is 6.25%, for a series of three fragments—0.4%. Clearly, the rate of reassembly errors caused by upstream fragmentation is unacceptable. The ability of DPM-enabled interface to recognize upstream fragmentation results in a different strategy for marking these packets as described previously herein.

Downstream Fragmentation

Downstream fragmentation is unknown to DPM. The DPM-enabled interface has no knowledge if the marked datagrams, are being fragmented anywhere along the path. Therefore, the datagrams, which will be fragmented after the marking cannot be treated differently from the traffic, which is not fragmented.

Luckily, fragmentation downstream from the DPM-enabled interface does not causes any problems for reassembly. The router, which is going to perform fragmentation, will simply insert the content of the ID field of the original datagram into every fragment. The value of RF will also be copied to every fragment as specified in F. Baker, "Requirements for IP version 4 routers", RFC 1812, June, 1995. At the destination, reassembly will be successful since the ID field will be the same for every fragment in the series. The fact that the ID field was set by DPM, and replaced the original value set by the host is unknown to the destination, and is irrelevant for the purpose of reassembly.

Fragment-Persistent DPM

The modification to the DPM marking procedure which will eliminate most of the potential errors associated with upstream fragmentation is now considered. The fundamental modification will be discussed first, followed by gradual changes resulting in the final marking procedure.

Fundamentals of Handling Upstream Fragmentation with DPM

It is essential for proper reassembly that all of the fragments of the original datagram have the same ID field. The basic DPM marks packets randomly choosing among f×k marks. This randomness must be suspended when processing fragments. In order to accomplish this task, DPM has to keep track of the fragments which pass through. If a certain mark was inserted in the first fragment, that DPM-enabled interface encounters (which does not have to be the fragment with offset 0), then the same mark must be inserted into the rest of the fragments of this series. The information about which mark is used for which series has to be stored in a table, called FragTbl, at the DPM enabled interface and checked every time a new fragment arrives. To identify fragments belonging to the same original datagram, DPM should check if the tuple of the four fields utilized by the reassembly function (SA, DA, P, ID) is the same as any other it marked within the maximum reassembly timeout of 120 seconds.

FIG. 9 illustrates the fundamental changes to the DPM marking procedure for fragmentation support. If the packet is not a fragment, there would be no changes in handling it. If, however, the packet is a fragment, then DPM determines if it is the first fragment in the series that it sees. If it is the first one, then the process is identical to the non-fragment case, but, in addition, DPM stores the result of the concatenated hash function number and segment number. This $\log_2(f \times k)$-bit pattern uniquely identifies every mark at this interface, and is arithmetically equal to the index of the Marks array used in the procedure. This would allow to set the mark of all the remaining fragments in this series to the same value as the first fragment. When the packet is identified as a fragment and DPM marking procedure was able to find the hash function number and the segment number assigned to its series, the corresponding mark is inserted. The reconstruction procedure at the victim will not change and will be identical to the reconstruction procedure of the basic DPM.

Dealing with Infinite Series

Assuming that an attacker can generate any packet, it is possible that he will utilize artificial fragmentation. That is sending packets with MF Flag set to '1' or non-zero offset field when fragmentation is not necessary for the proper reason—the datagram exceeding the MTU of a given link. With artificial fragmentation, the attacker may generate infinitely many packets with the same SA, DA, P, and ID fields, that would look like fragments of one very long series to the DPM-enable interface or the destination. This is known as an infinite series. The invalid traffic would be noticed only by the destination at the reassembly function, but for (D)DoS attacks it would be enough that the invalid packets occupy the resources of the victim. In this situation, the victim will never recover the full ingress address since only a single mark would be available.

To remedy this situation, another simple modification in addition to fragment persistence must be introduced. The modification is based on the findings in Shannon et al., "Beyond folklore: observations in tragmental traffic", IEEE/ACM Trans. Networking, vol. 10, No. 6, pp. 709-720, December 2002, where it was determined from the real traffic traces that the longest series on the Internet is 44 fragments. Deterministic Packet Marking should recognize the fact that if the number of fragments in the series exceeds 44, it is, in all likelihood, an attack, or a result of some errors. In either case, such traffic is not expected to be properly reassembled. So, after DPM has persistently marked 44 fragments of a single series with the same mark, any additional fragments from the same series will be marked randomly, as if it was not a fragment.

In order to implement this modification, the FragTbl, which DPM uses to account for fragments and where the segment value corresponding to (SA, DA, P, ID) is kept, should also keep a counter, which should be incremented every time a fragment with a given tuple is encountered. Once this counter exceeds 44, marking persistence should be suspended and randomness should be reinstated. FIG. 10 illustrates this concept with a pseudo code.

Practical Compromise

The modification described above will accommodate all of the valid fragmented traffic. However, artificial fragmentation may still be used by the attacker to generate bogus 44-fragment series directed to the victim. This will allow the attacker to increase the expected number of packets required to be marked by a DPM-enabled interface in order for the victim to be able to reconstruct its address, E[Pkt], by the factor of 44. It is possible to modify the procedure outlined above to significantly reduce this factor with the minimal trade-off.

According to C. Shannon, op. cit. about 99% of series are only two or three fragments long. This fact may be taken into consideration when resuming randomness. It follows then that if the randomness in selecting the mark is resumed after only three fragments have passed through the DPM-enabled interface, 99% of fragmented datagrams will be unaffected and will reassemble successfully at the destination. To the attacker, this will make sending series longer than three fragments to the victim totally pointless. For example sending a series of 45 fragments will result in three fragments marked with the same mark, and the remaining 42 fragments marked randomly. The marks will be picked at random 43 times. Assuming f×k=16, approximately 15 different marks will be sent to the victim, according to the classical occupancy problem discussed in Feller (op. cit.). The same number of packets may be sent to the victim if the attacker sends 15 series, three fragments each. All three fragments in every series will be marked with the same mark. Therefore, random mark will be picked only 15 times, resulting in approximately 10 different marks sent to the victim. Clearly, sending series of three fragments to the victim becomes the most sensible option for the attacker. While this approach will take care of all two and three fragment series, which account for 99% of all series, the remaining 1% of valid series, which contain more than three fragments will almost never get reassembled at the destination.

The compromise approach to the fragmentation problem is now presented. When the DPM-enabled interface encounters the first (not necessarily with offset 0) fragment in a series, it decides if the randomness will be suspended for three fragments or for 44 fragments in this series. The probability p, with which the randomness is suspended for 44 fragments, should be selected in such a way that there is no advantage to the attacker in sending series longer than three fragments.

Sending series of more than 44 fragments does not make any sense. It is certain that the marks selected at random will be inserted in the fragments after the 44th. However, the attacker may send series of exactly 44 fragments hoping that the number of packets sent to the victim would be greater than it were using three fragment series for the same number of marks. If the attacker generates 44 fragment series, the situation when only a single mark is inserted in all the fragments will occur with probability p. The alternative is the situation when only the first thee fragments will have the same mark, and the remaining 41 fragments will have randomly picked marks inserted. Thus, 42 randomly picked marks would be transferred to the victim in the fragments of this series. This situation will occur with probability (1−p).

It is desired to find the value of p such that the expected number of packets per randomly selected mark, C, is the same for both approaches. This would minimize the undesirable effect the modification has on longer valid series without creating any benefit to the attacker of using the longer artificial series. Denote D as the number of datagrams being sent. In case of sending series of three fragments, the expected number of times marks are randomly picked (different from the number of marks acquired by the victim) is D, and the number of packets sent to the victim is 3D. In case of sending 44 fragment series, the expected number of randomly chosen marks is D(42(1−p)+p), and the number of packets sent to the victim is 44D. The ratio of number of packets to the number of generated marks will be called a fragmentation coefficient C. For the two options of using artificial fragmentation, C must be the same.

$$((44D)/(D(42(1-p)+p)))=((3D)/D)$$

$$((44)/(42(1-p)+p))=3$$

Solving for p results in the value of (⅔). It is important that the number of datagrams sent by the given host does not affect the value of p. This means that DPM can suspend randomness in mark selection for 44 fragments in two out of every three datagrams. Approximately 33.3% of the datagrams fragmented into more than three fragments upstream would fail to reassemble at the destination. The fragmented traffic is only 0.5% of the overall traffic. Therefore about 0.0017% of the overall traffic would be affected. The pseudo code of the encoding procedure reflecting the practical compromise is depicted in FIG. 11. Processing at the victim is not affected by any of these modificatinos.

Size of the FragTbl

The amount of memory required for the FragTbl is now analyzed. This is an important issue since this memory overhead will be incurred by the routers, and as was mentioned earlier the ISPs involvement for the scheme should be minimal. The amount of memory required for the FragTbl depends on the interface speed and will vary for different interfaces. In this section, the estimation of the size of FragTbl is presented.

The size of FragTbl is directly proportional to the rate of the DPM enabled interface, R. The interfaces with the higher rate are able to process more packets per second. As mentioned earlier, according to C. Shannon (op. cit.), approximately 0.5% of IP packets are fragmented. For every series, 12 Bytes (4-Byte SA, 4-Byte DA, 2-Byte ID, 1-Byte P, 4-bit fk value, and 1-bit required to store two values of threshold for the number of fragments to resume randomness) are allocated in the FragTbl and every entry should be held in the FragTbl for 120 seconds. Keeping the entry longer than 120 seconds is unpractical since the reassembly process at the destination of the fragments will timeout after 120 seconds according to R. Braden, "Requirements for Internet hosts—communications layers" RFC 1122 October, 1989. The average packet size of 1000 bits is conservatively considered as it was by A. Snoeren et al. "Single packet IP traceback *IEEE/ACM Trans. Networking*, 10, pp. 721-734, December, 2002. The recent traffic measurement studies suggest that the average packet size is, however is closer to 400 to 600 Bytes. It follows then that the size of the FragTbl in Bytes is given by:

$$((R \text{ bits}/s's \times 1203 \times 0.005 \times 12 \text{ Bytes})/(1000 \text{ bits}))= 0.0072R \text{ M Bytes}$$

Table III summarizes memory requirements of FragTbl for various commonly used interfaces. The interfaces, which are likely to be on the edges of even a large ISP, would not require more than 20 MBytes of Random Access Memory (RAM).

TABLE III

Interfaces, Rates and Estimated FragTbl Size,

| Interface | Rate | FragTbl Size |
|---|---|---|
| OC-768 | 40 Gb/s | 288 MByte |
| OC-192, 10GigE | 10 Gb/s | 72 MByte |
| OC-48 | 2.5 Gb/s | 18 MByte |
| OC-24 | 1.25 Gb/s | 9 MByte |
| GigE | 1 Gb/s | 7.2 MByte |
| OC-12 | 622 Mb/s | 4.5 MByte |
| OC-3 | 155 Mb/s | 1.12 MByte |
| Fast Ethernet | 100 Mb/s | 0.72 MByte |
| OC-1 | 51.84 Mb/s | 0.37 MByte |
| DS3 | 44.736 Mb/s | 0.33 MByte |
| DS2 | 6.312 Mb/s | <64 KByte |
| DS1 | 1.544 Mb/s | |
| DS1C | 3.152 Mb/s | |
| DS0 | 64 kb/s | |

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method in a communication network, the method comprising:
    receiving one or more packets at a network node;
    determining whether the received packet is a fragment;
    modifying each received packet by writing information formed based on one or more bits of a network address of the network node into the received packet, wherein if the packet is a fragment, the information written into the packet is the same for every fragment of a particular series of fragments; and
    forwarding the modified packets.

2. The method of claim 1, wherein the method further comprises determining if the received packet is a first fragment of a particular series of fragments, and wherein the information written into the packet is selected at random from a number of possible pieces of candidate information based on one or more bits of the network address of the communication device if the received packet is the first fragment of a particular series of fragments.

3. The method of claim 2, wherein determining whether the received packet is the first fragment of a particular series of fragments comprises:
  determining a value of one or more bits of the received packet;
  matching the value with values of the one or more bits of the previously received packets; and
  concluding that the received packet is the first fragment in its series if no match is found.

4. The method of claim 1, wherein the same information is written into no more than a predetermined number of fragments of a series of fragments.

5. The method of claim 4, wherein the predetermined number is 3.

6. The method according to claim 5, wherein the predetermined number is 44.

7. The method of claim 1, wherein the received packet is an Internet Protocol (IP) version 4 packet.

8. The method of claim 7, wherein determining whether the received packet is a fragment comprises:
  determining a value of an offset field in the received packet header; and
  determining a value of a more fragments flag field in the received packet header.

9. A system comprising:
  an input interface for receiving one or more packets;
  a processor configured to:
    determine whether a received packet is a fragment; and
    modify each received packet by writing information formed based on one or more bits of a network address of the system, wherein if the packet is a fragment, the information written into the packet is the same for every fragment of a particular series of fragments, into the received packet; and
  an output interface for forwarding the modified packets.

10. A system in accordance with claim 9, wherein the processor is further configured to maintain a fragmentation table used to account for fragments and to keep a counter that is incremented every time a fragment of a given series of fragments is encountered; and wherein once said counter exceeds a predetermined number, marking persistence is suspended and randomness is reinstated.

11. A system in accordance with claim 10, wherein the processor is configured to execute a method consistent with pseudo code given by:

---

Marking procedure at router R, edge interface A:
for z = 0 to f − 1
 Digest:= $H_z(A)$
 for y = 0 to k − 1
  Marks[z × k + y].Hash_num := z
  Marks[z × k + y].Digest := Digest
  Marks[z × k + y].Seg_Num := y
  Marks[z × k + y].A_bits := A[y]
for each incoming packet w
 let x be a random integer from [0, f × k)
 if w.MF == '1' OR w.offset ≠ 0 then
  if FragTbl[SA, DA, P, ID] == NIL then
   create FragTbl[SA, DA, P, ID]
   FragTbl[SA, DA, P, ID].Mark_num := x

---

-continued

---

FragTbl[SA, DA, P, ID].counter := 1
  else
   if FragTbl[SA, DA, P, ID].counter < 45 then
    x := FragTbl[SA, DA, P, ID].Mark_num
    FragTbl[SA, DA, P, ID].counter++
 write Marks[x] into w.Mark.

---

12. The system according to claim 10, wherein the predetermined number is 3.

13. The system according to claim 10, wherein the predetermined number is 44.

14. A method for enabling a victim destination in a communication network to identify a source of an anonymous attack, the method comprising:
  receiving at the victim destination packets marked upon entry to the communication network with a partial ingress address, wherein the partial ingress address in the packet remains unchanged prior to reaching the victim destination, and wherein a sufficient number of said marked packets is received to enable recovery of the entire ingress address;
  recovering the entire ingress address based on the marked packets; and
  correlating the recovered ingress address with a source address of the associated marked packets upon entering the network, to thereby identify the ingress address for the said source address;
  wherein the partial ingress address with which packets that are fragments belonging to a common series of fragments are marked is the same for the fragments belonging to the common series of fragments.

15. The method in accordance with claim 11, wherein the partial ingress address with which the fragments of a series of fragments were marked comprises a result of a concatenated hash function number and segment number as a bit pattern uniquely identifying every mark at a marking node of the communication network, and which is arithmetically equal to an index of a marks array used.

16. A method in accordance with claim 15, wherein pseudo code for the marking algorithm used to mark the packets is given by:

---

Marking procedure at router R, edge interface A:
for z = 0 to f − 1
 Digest:= $H_z(A)$
 for y = 0 to k − 1
  Marks[z × k + y].Hash_num := z
  Marks[z × k + y].Digest := Digest
  Marks[z × k + y].Seg_Num := y
  Marks[z × k + y].A_bits := A[y]
for each incoming packet w
 let x be a random integer from [0, f × k)
 if w.MF == '1' OR w.offset ≠ 0 then
  if FragTbl[SA, DA, P, ID] == NIL then
   create FragTbl[SA, DA, P, ID]
   FragTbl[SA, DA, P, ID] := x
  else
   x := FragTbl[SA, DA, P, ID]
 write Marks[x] into w.Mark.

---

17. The method of claim 14, wherein if the fragments of the same series of fragments were formed downstream from a network node at which the packet from which the fragments were formed was marked, the marking used for the packet was inserted into every fragment formed from the packet.

* * * * *

UNITED STATES PATENT AND TRADEMARK OFFICE
CERTIFICATE OF CORRECTION

PATENT NO. : 7,908,654 B2
APPLICATION NO. : 11/079451
DATED : March 15, 2011
INVENTOR(S) : Belenky et al.

It is certified that error appears in the above-identified patent and that said Letters Patent is hereby corrected as shown below:

Title page, item (54), under "Title", in Column 1, Line 1, delete "ACCOMODATING" and insert -- ACCOMMODATING --.

Page 2, item (56), under "Other Publications", in Column 1, Line 29, delete "Syposium" and insert -- Symposium --.

Page 2, item (56), under "Other Publications", in Column 2, Line 11, delete "idetification" and insert -- identification --.

Page 2, item (56), under "Other Publications", in Column 2, Line 26, delete ""implementing" and insert -- "Implementing --.

Column 1, line 1, delete "ACCOMODATING" and insert -- ACCOMMODATING --.

Column 17, line 22, in Claim 6, delete "claim 5," and insert -- claim 4, --.

Column 17, line 42, in Claim 10, delete "A system" and insert -- The system --.

Column 17, line 49, in Claim 11, delete "A system" and insert -- The system --.

Column 17, line 61, in Claim 11, delete "[0, f × k)" and insert -- [0, f × k] --.

Column 18, line 32, in Claim 15, delete "claim 11," and insert -- claim 14, --.

Column 18, line 39, in Claim 16, delete "A method" and insert -- The method --.

Column 18, line 51, in Claim 16, delete "[0, f × k)" and insert -- [0, f × k] --.

Signed and Sealed this
Twenty-sixth Day of July, 2011

David J. Kappos
*Director of the United States Patent and Trademark Office*